(12) United States Patent
Kramer

(10) Patent No.: US 9,025,641 B2
(45) Date of Patent: May 5, 2015

(54) DISTRIBUTED TRANSMISSION INVOLVING COOPERATION BETWEEN A TRANSMITTER AND A RELAY

(75) Inventor: Gerhard G. Kramer, Chatham, NJ (US)

(73) Assignee: Alcatel Lucent, Boulogne Billancourt (FR)

(*) Notice: Subject to any disclaimer, the term of this patent is extended or adjusted under 35 U.S.C. 154(b) by 1090 days.

(21) Appl. No.: 11/425,608

(22) Filed: Jun. 21, 2006

(65) Prior Publication Data

US 2007/0297498 A1   Dec. 27, 2007

(51) Int. Cl.
*H04B 3/36* (2006.01)
*H04B 7/155* (2006.01)

(52) U.S. Cl.
CPC .................. *H04B 7/15557* (2013.01)

(58) Field of Classification Search
USPC ......... 375/260, 211, 259, 214, 295, 316, 288; 370/315, 316, 335, 336, 342, 345
See application file for complete search history.

(56) References Cited

U.S. PATENT DOCUMENTS

| | | | | |
|---|---|---|---|---|
| 5,136,663 A | * | 8/1992 | Nishio | 382/253 |
| 5,339,164 A | * | 8/1994 | Lim | 358/426.02 |
| 7,123,875 B1 | * | 10/2006 | Marko et al. | 455/3.02 |
| 7,301,983 B1 | * | 11/2007 | Horne | 375/130 |
| 7,920,501 B2 | * | 4/2011 | Larsson et al. | 370/315 |
| 2004/0095920 A1 | * | 5/2004 | Lippman et al. | 370/351 |
| 2005/0265387 A1 | * | 12/2005 | Khojastepour et al. | 370/467 |
| 2006/0022847 A1 | * | 2/2006 | Lee et al. | 341/50 |
| 2006/0165189 A1 | * | 7/2006 | Tamaki et al. | 375/260 |
| 2006/0291440 A1 | * | 12/2006 | Hausl et al. | 370/340 |
| 2007/0010196 A1 | * | 1/2007 | Periyalwar et al. | 455/7 |
| 2007/0217432 A1 | * | 9/2007 | Molisch et al. | 370/400 |

OTHER PUBLICATIONS

Kramer; "Communication Strategies and Coding for Relaying;" Institute for Mathematics and its Applications (IMA); 2005 Summer Program on Wireless Communications, University of Minnesota, Minneapolis, MN; Jun. 22-Jul. 1, 2005; pp. 1-13.
Kramer; "Distributed and Layered Codes for Relaying;" Proc. Asilomar Conf. on Signals, Systems and Computers, Pacific Grove, CA; Oct. 30-Nov. 2, 2005; pp. 1752-1756.

* cited by examiner

*Primary Examiner* — Siu Lee
(74) *Attorney, Agent, or Firm* — Hitt Gaines, P.C.

(57) ABSTRACT

The present invention provides, in one embodiment, a method of transmitting a message. The method includes transmitting a first codeword from a transmitter to a relay. The method also includes subsequently transmitting a second codeword based on the first codeword from the relay and a third codeword from the transmitter wherein the second and third codewords are transmitted concurrently.

18 Claims, 10 Drawing Sheets

DISTRIBUTED TRANSMISSION INVOLVING COOPERATION BETWEEN A TRANSMITTER AND A RELAY

TECHNICAL FIELD OF THE INVENTION

The present invention is directed, in general, to communication systems and, more specifically, to a method of transmitting a message, an apparatus for cooperative transmission and a system for distributed transmission employing the method or the apparatus.

BACKGROUND OF THE INVENTION

Information theory usually models a communication channel by a conditional probability distribution. For example, a model for communicating a symbol from one point to another might involve the conditional probability distribution $P_{Y|X}(\bullet)$ that evaluates to:

$$P_{Y|X}(b|a), a \in X, b \in Y, \quad (1)$$

where X and Y are random variables taking on values in the discrete and finite alphabets X and Y, respectively. The aim of communication is to transmit reliably a message index W taking on one of M values from a transmitter to a receiver. Suppose that to accomplish this task one transmits a string of n symbols $X^n = X_1, X_2, \ldots, X_n$ over the channel. The rate of communication is then $$R = \log_2(M)/n \quad (2)$$

Bits per channel use. The maximum rate C at which one can transmit reliably is called the capacity of the channel.

A relay channel is a multiterminal channel with three parties or nodes: a transmitter (node 1), a relay (node 2), and a receiver (node 3). A possible model for relaying might involve the probabilities $$P_{Y_2 Y_3 | X_1 X_2}(b_2, b_3 | a_1, a_2), \quad (3)$$

where $X_1$ is the transmitter's channel input, $Y_3$ is the receiver's channel output, and $X_2$ and $Y_2$ are the relay's input and output, respectively. The idea is that the transmitter and receiver can only transmit and receive, respectively, but the relay can both transmit and receive. Suppose that the transmitter and relay transmit the strings $X_1^n = X_{11}, X_{12}, \ldots, X_{1n}$ and $X_2^n = X_{21}, X_{22}, \ldots, X_{2n}$, respectively, over the channel. Suppose further that the relay can react quickly so that its input $X_{2i}$ can be any function of its past outputs $Y_2^{i-1}$. The relay channel is said to be memoryless if one has $$P_{Y_{2i} Y_{3i} | W X_1^i X_2^i Y_2^{i-1} Y_3^{i-1}}(b_{2i}, b_{3i} | \omega, a_1^i, a_2^i, b_2^{i-1}, b_3^{i-1})$$
$$= P_{Y_2 Y_3 | X_1 X_2}(b_{2i}, b_{3i} | a_{1i}, a_{2i}) \quad (4)$$

for all $a_1^i$, $a_2^i$, $b_2^i$, $b_3^i$, and $i=1, 2, \ldots, n$. Only memoryless channels will be considered. Again, the maximum rate C at which one can transmit reliably is called the capacity of the channel.

A relay network is a generalization of a relay channel to a system with T nodes: a transmitter (node 1), T-2 relays (nodes 2 to T-1), and a receiver (node T). A model for relaying would involve the probabilities $$P_{Y_2 Y_3 \ldots Y_T | X_1 X_2 \ldots X_{T-1}}(b_2, b_3, \ldots b_T | a_1, a_2, \ldots, a_{T-1}). \quad (5)$$

The relay network is memoryless if the natural extension of the condition (4) is true, that is, if the ith channel outputs $Y_{ti}$, $t=2,3,\ldots,T$, depend only on the ith channel inputs $X_{ti}$, $t=1, 2, \ldots, T-1$, given the message, the present (or ith) and past channels inputs, and past channel outputs. The capacity C is again the maximum rate at which one can transmit reliably.

Several types of relaying strategies may be employed in relay channels or networks. In an amplify-and-forward strategy, the relay amplifies the most recent $Y_2$. More generally, the relay transmits some function of a small number of the past $Y_2$. In a compress-and-forward strategy, the relay quantizes, compresses, and channel encodes a string of $Y_2$ and transmits the resulting quantized values digitally to the receiver. A more sophisticated quantization exploits the statistical dependence between $Y_2$ and $Y_3$ to reduce the compression rate. In these systems, the transmitter transmits and the relay is silent in a first block, and then the transmitter is silent and the relay transmits in a second block. This mutually exclusive transmitting between the transmitter and the relay typically causes the transmission rate of the transmission system to suffer.

Accordingly, what is needed in the art is a way to overcome the limitations of the current art.

SUMMARY OF THE INVENTION

To address the above-discussed deficiencies of the prior art, the present invention provides, in one embodiment, a method of transmitting a message. The method includes transmitting a first codeword from a transmitter to a relay. The method also includes subsequently transmitting a second codeword based on the first codeword from the relay and a third codeword from the transmitter, wherein the second and third codewords are transmitted concurrently.

In another aspect, the invention provides an apparatus for cooperative transmission. In one embodiment, the apparatus includes a transmitter configured to transmit a first codeword to a relay and subsequently transmit a third codeword while the relay is transmitting a second codeword that is based on the first codeword. In another embodiment, the apparatus includes a relay configured to transmit a second codeword concurrently with a third codeword transmitted by a transmitter wherein the second codeword is based on a first codeword transmitted by the transmitter.

The present invention also provides, in yet another aspect, a system for distributed transmission. The system includes a transmitter and a relay. The transmitter transmits a first codeword to the relay. Additionally, the relay subsequently transmits a second codeword based on the first codeword, and the transmitter further transmits a third codeword concurrently with the second codeword.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
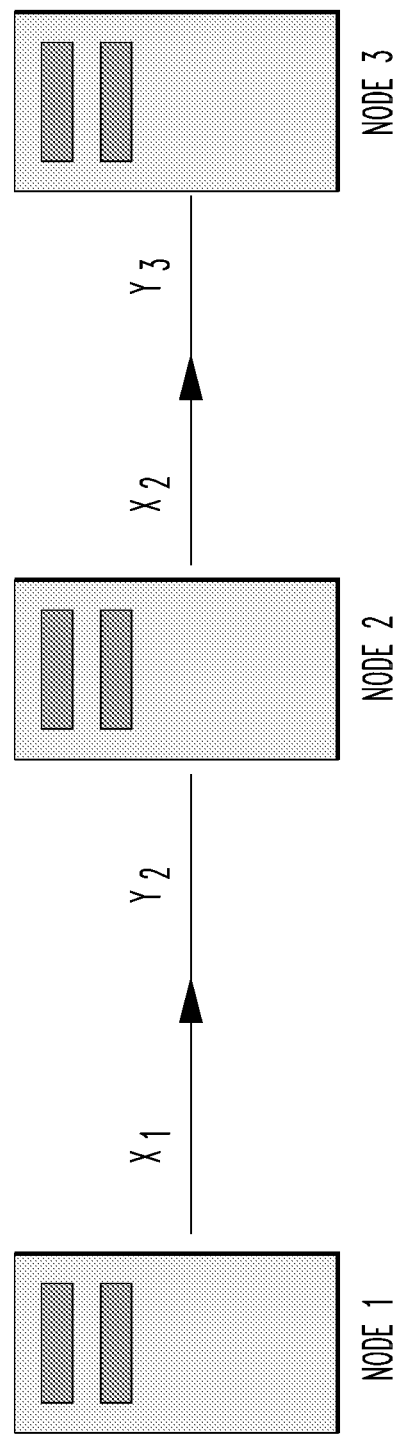
FIG. 1 illustrates a wireline network with three terminals.

The memoryless relay channel defined by (3) models a variety of communication problems. Consider, for example, a wireline network with three terminals depicted in FIG. 1. The idea is that the transmitter (node 1) is wired to the relay (node 2), which is wired to the receiver (node 3). One might therefore expect that $Y_2$ is a noisy function of $X_1$ only, and that $Y_3$ is a noisy function of $X_2$ only. In this case the channel distribution (3) satisfies $$P_{Y_2Y_3|X_1X_2}(b_2,b_3|a_1,a_2) = P_{Y_2|X_1}(b_2|a_1) \cdot P_{Y_3|X_2}(b_3|a_2) \qquad (6)$$

for all $a_1, a_2, b_2, b_3$. If the channels are essentially noise-free, equation (28) might be considered:

$$P_{Y_2Y_3|X_1X_2}(b_2,b_3|a_1,a_2) = 1(b_2=a_1) \cdot 1(b_3=a_2), \qquad (7)$$

where $1(\bullet)$ is the indicator function that takes on the value one if its argument is true and is zero otherwise.

Some wireline problems have constraints on the network nodes and not only (capacity constraints) on the network channels or edges. For instance, suppose the relay (node 2) has limited processing power and can either transmit or receive, but not both. For noise-free networks, one might model this via the constraint $$Y_2 = \begin{cases} X_1, & \text{if } X_2 = 0 \\ 0, & \text{if } X_2 \neq 0 \end{cases}. \qquad (8)$$

Note that (6) is no longer true. However, equation (9) may be written $$P_{Y_2Y_3|X_1X_2}(b_2,b_3|a_1,a_2) = P_{Y_2|X_1X_2}(b_2|a_1,a_2) \cdot P_{Y_3|X_2}(b_3|a_2) \qquad (9)$$

for all $a_1, a_2, b_2, b_3$. More generally, a relay channel is said to be physically degraded if one can write $$P_{Y_2Y_3|X_1X_2}(b_2,b_3|a_1,a_2) = P_{Y_2|X_1X_2}(b_2|a_1,a_2) \cdot P_{Y_3|X_2Y_2}(b_3|a_2,b_2). \qquad (10)$$

For all $a_1, a_2, b_2, b_3$. The channels (6), (7), and (9) are therefore physically degraded.

Figure 2:
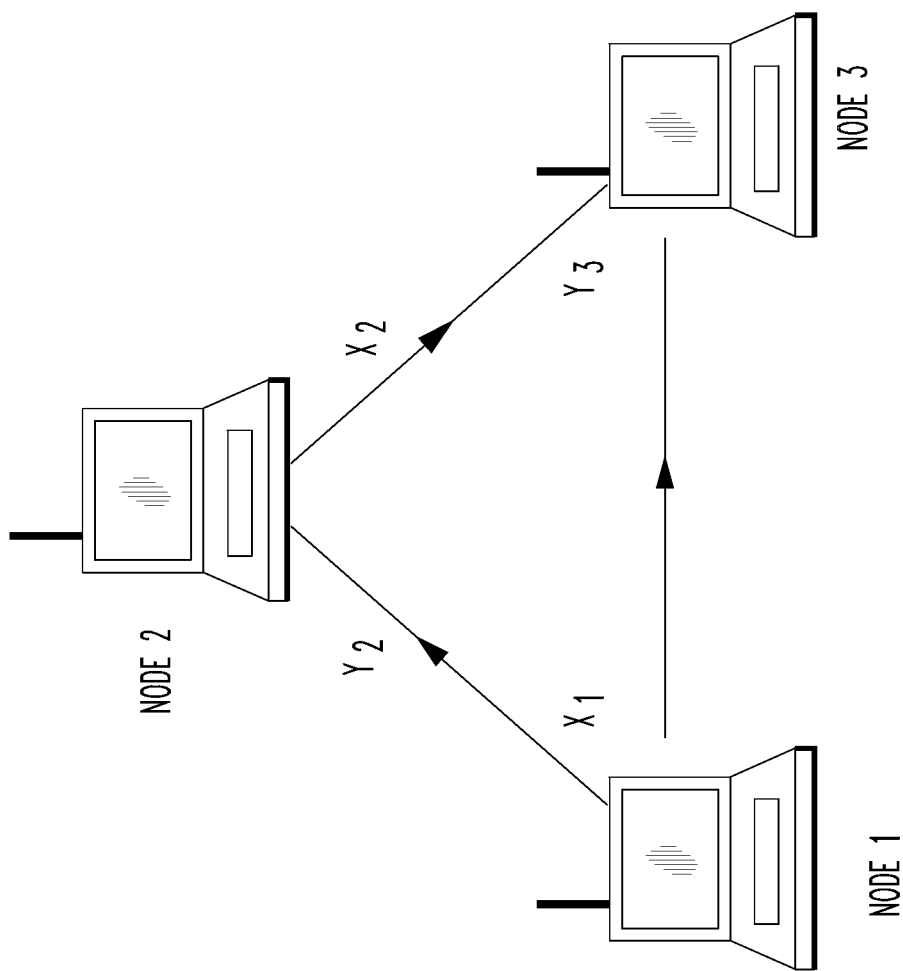
FIG. 2 illustrates a wireless network with three terminals.

Consider a wireless network depicted in FIG. 2. For such networks one usually replaces the probability distribution (1) with a probability density $P_{Y|X}(\bullet)$. A commonly-studied class of probability densities is based on an additive white Gaussian noise (AWGN) model with $$Y_2 = \frac{h_{12}}{d_{12}^{\alpha/2}} X_1 + Z_2 \qquad (11)$$

$$Y_3 = \frac{h_{13}}{d_{13}^{\alpha/2}} X_1 + \frac{h_{23}}{d_{23}^{\alpha/2}} X_2 + Z_3 \qquad (12)$$

where $X_1, X_2, Y_2, Y_3, Z_2, Z_3$ are complex random variables, $h_{ij}$ and $d_{ij}$ are the respective (fading) channel gain and distance between nodes i and j, and $\alpha$ is an attenuation exponent (e.g., $\alpha=2$ for free space propagation). The average energies (or powers) of the inputs are constrained as $$\sum_{i=1}^{n} E[|X_{ti}|^2]/n \leq P_t, \quad t=1,2. \qquad (13)$$

The idea of the above model is that the wireless channel permits broadcasting ($X_1$ affects both $Y_2$ and $Y_3$) but that this causes interference ($X_1$ and $X_2$ interfere at node 3).

It may be assumed that $h_{ij}$ is a realization of a complex random variable $H_{ij}$. The channel exhibits Rayleigh fading if the $H_{ij}$ are statistically independent, proper, complex, Gaussian, zero-mean, unit variance random variables. It is further assumed that $Z_2$ and $Z_3$ are independent, proper, complex, Gaussian, unit variance random variables that are independent of $X_1, X_2$, and the $H_{ij}$ for all i, j.

The model defined by (11) and (12) implicitly permits the relay to transmit and receive at the same time in the same frequency band. However, this is often not possible due to the large differences in transmit and receive energies at the antennas of wireless devices. Most practical wireless relays operate under a half-duplex constraint that one can model as $$Y_2 = \begin{cases} \frac{h_{12}}{d_{12}^{\alpha/2}} X_1 + Z_2, & \text{if } X_2 = 0 \\ 0, & \text{if } X_2 \neq 0 \end{cases}. \qquad (14)$$

Note the similarity between (8) and (14). Either with or without the half-duplex constraint, the wireless models considered do not satisfy (10) and are hence not physically degraded.

The capacity of a point-to-point memoryless channel (1) is known to be $$C = \max_{P_X(\bullet)} I(X;Y) \qquad (15)$$

where I(X;Y) is the mutual information between random variables X and Y. For the complex-alphabet AWGN model:

$$Y = X + Z, \qquad (16)$$

where $$\sum_{i=1}^{n} E[|X_i|^2]/n \le P$$

and Z is proper, Gaussian, unit-variance, and independent of X. The maximization in (15) is now performed over all probability density functions $p_X(\cdot)$ and the result is $$C=\log_2(1+P) \text{ bits per channel use,} \quad (17)$$

where it may be recalled that the channel has complex alphabets.

Consider the relay channel (3). The capacity of this channel is still not known except for special cases. However, good achievable rates and upper bounds on the capacity are known. For example, a standard cut-set upper bound on the capacity is $$C \le \max_{p_{X_1 X_2}(\cdot)} \min\{I(X_1; Y_2Y_3 | X_2), I(X_1X_2; Y_3)\}. \quad (18)$$

Next, a consideration of random coding strategies that achieve good rates for the relay channels of interest is presented.

Figure 3:
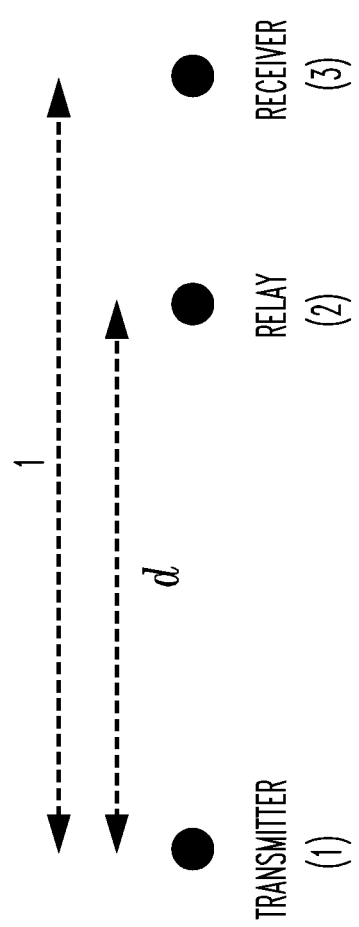
FIG. 3 illustrates a system diagram of a distributed transmitter employing a transmitter and a relay constructed in accordance with the principles of the present invention.

Turning now to FIG. 3, illustrated is a system diagram of a distributed transmitter employing a transmitter and a relay constructed in accordance with the principles of the present invention. The transmitter and the relay are arranged in a linear transmission geometry with a receiver wherein the relay is employed on a line between the transmitter and the receiver. The linear transmission geometry employs a distance d between the transmitter and the relay that is a real number such that $d_{13}=1$, $d_{12}=|d|$ and $d_{23}=|1-d|$. The relay would be to the left of the transmitter in FIG. 3 for negative d.

In the distributed transmission system shown of FIG. 3, the transmitter is configured to transmit a first codeword to the relay and also to the receiver in a first time block. The relay is configured to transmit a second codeword that is based on the first codeword to the receiver in a subsequent second time block. The transmitter is further configured to transmit a third codeword to the receiver while the relay is transmitting the second codeword.

In an alternative embodiment, an apparatus for cooperative transmission includes a transmitter that is configured to transmit a first codeword to a relay and subsequently transmit a third codeword while the relay is transmitting a second codeword that is based on the first codeword. In yet another embodiment, an apparatus for cooperative transmission includes a relay that is configured to transmit a second codeword concurrently with a third codeword transmitted by a transmitter wherein the second codeword is based on a first codeword transmitted by the transmitter. Therefore, either the transmitter or the relay may provide primary control of the distributed transmission.

Figure 4:
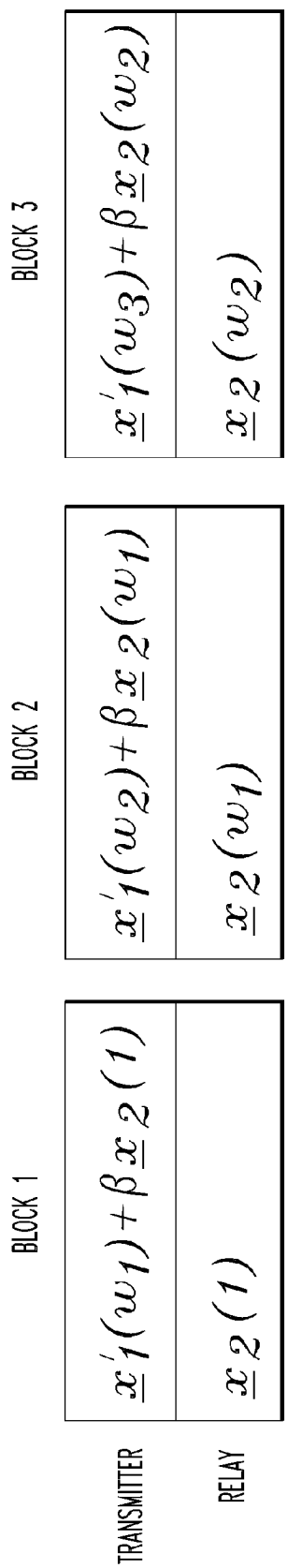
FIG. 4 illustrates a diagram of an embodiment of a transmission protocol employing a decode-and-forward (DF) strategy constructed in accordance with the principles of the present invention.

Turning now to FIG. 4, illustrated is diagram of an embodiment of a transmission protocol employing a decode-and-forward (DF) strategy constructed in accordance with the principles of the present invention. The DF strategy of FIG. 4 includes a set of time blocks Block 1, Block 2, Block 3 wherein each time block contains a transmitter and a relay portion, as shown. The embodiment of FIG. 4 represents a DF strategy for a full-duplex relay, which may decode (listen) and transmit (talk) at the same time.

Consider the AWGN channel with (11) and (12) and $d_{ij}=h_{ij}=1$ for all i, j. Two codebooks $C_1'$ and $C_2$ that both have $2^{nR}$ codewords of length n (assume that $2^{nR}$ is an integer for simplicity) are generated. Every codeword $\underline{x}_1'(w)$, $w=1, 2, \ldots, 2^{nR}$, in $C_1'$ is generated by choosing each of its n symbols independently using a proper, complex, Gaussian distribution with zero mean and variance $P_1'$ where $P_1' \le P_1$. The codewords $\underline{x}_2(w)$, $w=1, 2, \ldots, 2^{nR}$, in $C_2$ are generated in the same way except that the Gaussian distribution have variance $P_2$. The transmission protocol as depicted in FIG. 4 operates as follows.

Suppose W has nRB bits. Split these into B equally-sized blocks of nR bits $w_1, w_2, \ldots w_B$. Set $w_{B+1}=1$. In block b, b=1, 2, \ldots, B+1, the transmitter transmits $$\underline{x}_1(w_b, w_{b1})=\underline{x}_1'(w_b)+\beta \underline{x}_2(w_{b1}), \quad (19)$$

where $\beta=\sqrt{(P_1-P_1')/P_2}$. In block b the relay transmits $\underline{x}_2(w_{b-1})$. Note that using randomly-generated codebooks with the above transmission protocol will ensure that the power constraints (13) can be satisfied.

The decoding procedure is as follows. After block b, b=1, 2, \ldots B, the relay decodes $w_b$ by using its bth block of channel outputs. After block b, b=2, 3, \ldots B+1, the receiver decodes $w_b$ by using its $(b-1)^{st}$ and $b^{th}$ block of channel outputs.

One may show, using virtually the same analysis as for deriving (17), that the above decode-and-forward strategy achieves the rates R satisfying $$R<\log(1+P_1') \text{ and} \quad (20)$$

$$R<\log(1+P_1+(1+\beta)^2 P_2), \quad (21)$$

where the first and second bounds arise due to the respective relay and receiver decoding steps.

Figure 5:
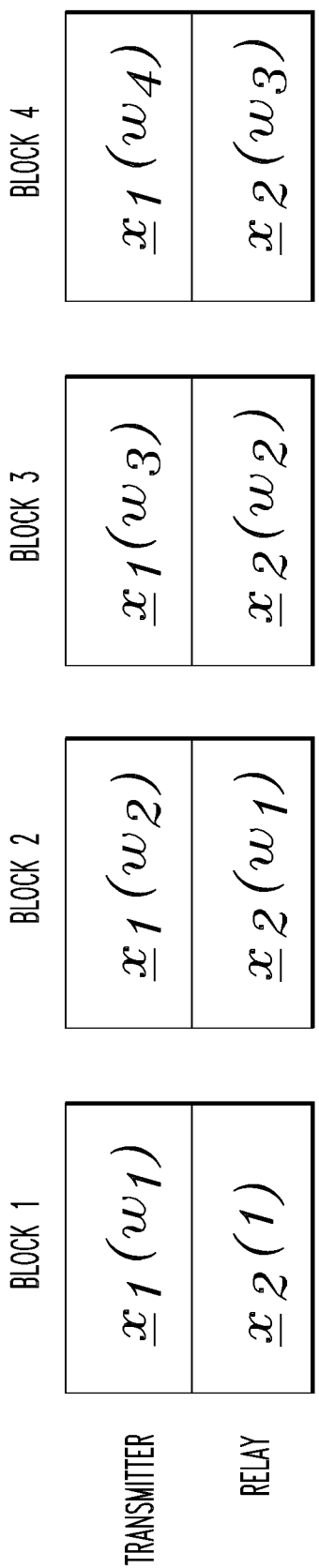
FIG. 5 illustrates a diagram of an alternative embodiment of a transmission protocol employing a decode-and-forward (DF) strategy constructed in accordance with the principles of the present invention.

Turning now to FIG. 5, illustrated is a diagram of an alternative embodiment of a transmission protocol employing a decode-and-forward (DF) strategy constructed in accordance with the principles of the present invention. The DF strategy of FIG. 5 includes a set of time blocks Block 1, Block 2, Block 3, Block 4 wherein each time block contains a transmitter and a relay portion, as shown. The alternative embodiment of FIG. 5 also represents a DF strategy for a full-duplex relay, which may decode and transmit at the same time.

From this point forward in the discussion, relay channels defined by (11) and (12) with Rayleigh fading are considered. That is, the $H_{ij}$ are independent, proper, complex, Gaussian, zero-mean, unit variance random variables. Suppose further that the transmitter node does not know the realizations of these random variables, the relay knows $H_{12}$ only, and the receiver knows $H_{13}$ and $H_{23}$ only. These restrictions on channel knowledge apply to the practical case where node j can accurately estimate its channel gains $H_{ij}$ but it cannot (or wishes not to) synchronize its waveform with the other transmitters.

Employing the encoding strategy discussed with respect to FIG. 4, one can show that it is best to choose $P_1'=P_1$ or $\beta=0$ in (19), which is depicted in FIG. 5. It may be shown that this strategy achieves capacity if the relay is in the vicinity of the transmitter node, but not necessarily colocated with it.

The discussion will now be directed to Block-Markov coding and modulation methods for relay channels that are motivated by coding methods for multiple-input, multiple-output (MIMO) channels. A partial decode-and-forward strategy may be shown to achieve high rates. Using this strategy, protocols constructed in accordance with the principles of the present invention employing one, two, and three codes are discussed and compared. Low-density parity-check (LDPC) codes are designed and simulated for a protocol related to Diagonal Bell-Labs Layered Space-Time (D-BLAST).

There is a direct relation between MIMO communication and relaying. Consider a MIMO channel wherein the "first"

MIMO channel input acts as the input of a transmitter node, and the remaining MIMO channel inputs act as inputs of relays that happen to be colocated with the transmitter node. One finds that D-BLAST encoding is precisely a Block-Markov superposition coding scheme for full-duplex relays. This insight is used to adapt coding strategies for MIMO communication to relay channels. For example, coding protocols are suggested for distributed bit-interleaved coded modulation (BICM), distributed Vertical-BLAST (V-BLAST) and distributed D-BLAST.

Recall that a memoryless relay channel may be defined by the conditional probability distribution:

$$P_{Y_2Y_3|X_1X_2}(a,b|c,d), \tag{22}$$

where $a \in \chi_2$, $b \in \chi_3$, $c \in \chi_1$, $d \in \chi_2$, $Y_2$ and $Y_3$ are the relay and receiver channel outputs, respectively, and $X_1$ and $X_2$ are the transmitter and relay channel inputs, respectively.

In a decode-and-forward strategy, the relay decodes the transmitter message, re-encodes it, and transmits the resulting codeword. The relay may use a different codebook than the transmitter. This method is employed in traditional multihopping, such as multi-hop wireless transmission systems employing the IEEE 802.11 standard, for example. A variation of this strategy may be employed. For example, a partial decode-and-forward (PDF) strategy has the transmitter split the message into two parts, use superposition encoding to transmit these two parts, and has the relay decode only one of the two parts.

Only decode-and-forward strategies and their variations are considered here, of which there are several types. For example, a regular encoding/sliding window decoding decode-and-forward strategy achieves the rate:

$$R = \max_{P_{X_1 X_2}} \min\{I(X_1; Y_2 | X_2), I(X_1 X_2; Y_3)\}. \tag{23}$$

The block Markov superposition encoding scheme used to achieve (23) has a diagonally layered structure that is basically the same as D-BLAST encoding. However, for half-duplex devices an improved transmission rate employing the PDF strategy may be represented by $$R = \max_{P_{UX_1X_2}} \min\{I(U; Y_2 | X_2) + I(X_1; Y_3 | UX_2), I(X_1X_2; Y_3)\}, \tag{24}$$

where $U-[X_1,X_2]-[Y_2,Y_3]$ forms a Markov chain. Observe that in (24)

$$I(X_1X_2;Y_3)=I(UX_2;Y_3)+I(X_1;Y_3|UX_2). \tag{25}$$

The PDF rate (24) is thus the sum of a DF rate (23) with U replacing $X_1$ and a single-hop rate $I(X_1;Y_3|UX_2)$.

Returning again to FIG. 3 wherein only Additive White Gaussian Noise (AWGN) channels with Rayleigh fading, and CSI at the receivers are considered in the following discussion. This scenario addresses fundamental issues concerning coding and modulation. The channel may be defined by $$\underline{Y}_2 = \left\{H_{12}, \frac{H_{12}}{d_{12}^{\alpha/2}} \underline{X}_1 + \underline{Z}_2\right\} \text{ and} \tag{26}$$

$$\underline{Y}_3 = \left\{H_{13}, H_{23}, \frac{H_{13}}{d_{13}^{\alpha/2}} \underline{X}_1 + \frac{H_{23}}{d_{23}^{\alpha/2}} \underline{X}_2 + \underline{Z}_3\right\}, \tag{27}$$

where $\underline{X}_t$, t=1, 2, and $\underline{Y}_t$ and $\underline{Z}_t$, t=2, 3, are complex column vectors of length $n_t$, $H_{st}$ is a complex $n_t \times n_s$ fading matrix, $d_{st}$ is the distance between nodes s and t, and $\alpha$ is an attenuation exponent (e.g., $\alpha$=2 for free space propagation). The $\underline{Z}_t$ have statistically independent, proper, complex, Gaussian, zero-mean, unit variance entries and are statistically independent of each other and all the $\underline{X}_t$ and $H_{st}$. Further suppose that $H_{st}$ is statistically independent of $\underline{X}_t$, t=1, 2, $\underline{Z}_t$, T=2, 3, and all other fading matrices. Rayleigh fading has $H_{st}$ that have statistically independent, proper, complex, Gaussian, zero-mean, unit variance entries. Now, consider the linear geometry depicted in FIG. 3 where $d_{13}$=1 and $d_{12} \le 1$ is primarily considered.

Let $\underline{X}_{ti}$ be the channel input of device (or node) t at time i. The transmitting nodes often have per device and block power constraints $$\sum_{i=1}^{n} E[\|\underline{X}_{ti}\|^2]/n \le P_t, \quad t=1,2, \tag{28}$$

where $\|\underline{X}\|^2 = \underline{X}^\dagger \underline{X}$ and $\underline{X}^\dagger$ is the complex-conjugate transpose of $\underline{X}$. Alternatively, one might use the network constraint $$\sum_{i=1}^{n} E[\|\underline{X}_{1i}\|^2 + \|\underline{X}_{2i}\|^2]/n \le P_1 + P_2 \tag{29}$$

or, perhaps, the symbol constraints $$E[\|\underline{X}_{ti}\|^2] \le P_t, \quad t=1,2, i=1,2,\ldots n. \tag{30}$$

Only (30) is considered below.

The model defined by (26) and (27) lets the relay transmit and receive at the same time in the same frequency band. This is often not possible due to large differences in transmit and receive powers. Wireless devices usually operate under a half-duplex constraint that one can model by replacing (26) with $$\underline{Y}_2 = \begin{cases} \left\{H_{12}, \frac{H_{12}}{d_{12}^{\alpha/2}} \underline{X}_1 + \underline{Z}_2\right\}, & \text{if } \underline{X}_2 = 0 \\ 0, & \text{if } \underline{X}_2 \ne 0 \end{cases}. \tag{31}$$

Alternatively, a mode $M_2$ may be introduced that takes on the values L and T for decode (listen) and transmit (talk), respectively. The transmitter is assumed to always talk and the receiver to always listen. This mode can be considered to be part of the relay's channel input so that (24) becomes $$R = \max_{P_{\underline{U}X_1X_2M_2}} \min\{I(\underline{U}; \underline{Y}_2 | X_2M_2) + I(X_1; \underline{Y}_3 | \underline{U}X_2M_2), \tag{32}$$

$$I(X_1X_2; \underline{Y}_3 | M_2) + I(M_2; \underline{Y}_3)\},$$

where U is a column vector of length $n_1$. Note that if $M_2$ is known ahead of time by the receiver, then one loses the gain $I(M_2;\underline{Y}_3)$ above. On the other hand, this gain might be difficult to realize because the relay must switch rapidly between $M_2=L$ and $M_2=T$. For simplicity, this gain will be ignored here.

Let $\underline{V}$ be a column vector of length $n_1$ and let I be an appropriately sized identity matrix. Additionally, $\underline{U}$, $\underline{V}$, and $\underline{X}_2$ are chosen to be statistically independent, proper, complex, Gaussian, zero-mean, and having covariance matrices $\beta(M_2)PI$, $(1-\beta(M_2))P_1I$, and $P_2I$, respectively, where $0 \leq \beta(M_2) \leq 1$ (note that (30) prevents using power control across modes). Further choose $\underline{X}_1 = \underline{U} + \underline{V}$. The resulting expressions in (32) with the model defined by (27) and (31) are $$I(\underline{U}; \underline{Y}_2 | \underline{X}_2, M_2 = L) = \qquad (33)$$
$$\int_h P(h) \log \left| I + \frac{P_1}{d_{12}^\alpha} hh^\dagger \right| \cdot \left| I + \frac{(1-\beta(L))P_1}{d_{12}^\alpha} hh^\dagger \right|^{-1} dh,$$

$$I(\underline{X}_1; \underline{Y}_3 | \underline{U}\underline{X}_2, M_2 = m_2) = \int_h p(h) \log \left| I + \frac{(1-\beta(m_2))P_1}{d_{13}^\alpha} hh^\dagger \right| dh, \qquad (34)$$

$$I(\underline{X}_1\underline{X}_2; \underline{Y}_3 | M_2 = L) \int_h p(h) \log \left| I + \frac{P_1}{d_{13}^\alpha} hh^\dagger \right| dh, \text{ and} \qquad (35)$$

$$I(\underline{X}_1\underline{X}_2; \underline{Y}_3 | M_2 = T) = \int_{h,\tilde{h}} p(h) p(\tilde{h}) \log \left| I + \frac{P_1}{d_{13}^\alpha} hh^\dagger + \frac{P_2}{d_{23}^\alpha} \tilde{h}\tilde{h}^\dagger \right| dh d\tilde{h} \qquad (36)$$

where the p(h) and p($\tilde{h}$) are Gaussian fading distributions (h and $\tilde{h}$ are matrices in general). Note that for $d_{12} \leq d_{13}$ it is best to choose $\beta(L)=1$ and $\beta(T)=0$. Moreover, this distribution is basically the same as using a strategy depicted in FIG. 6C where $\underline{X}_1$ has the same distribution irrespective of $M_2$. It therefore remains to optimize $P_{M_2}(\cdot)$. In fact, this optimization will be avoided, and only $P_{M_2}(L) = P_{M_2}(T) = \frac{1}{2}$ will be considered.

Consider a MIMO channel with M transmit and N receive antennas. The MIMO methods listed in Table I (where APP refers to "a posteriori probability") may be considered.

TABLE 1

Comparison of MIMO Coded Modulation Methods

| Strategy | Advantages | Disadvantages |
|---|---|---|
| (A) Direct Mapping | (1) Use one code. (2) Achieve ergodic and quasistatic information rates. | (1) Custom code designs required. (2) Many APP detector updates (steep EXIT). |
| (B) BICM | (1) Use one code designed for AWGN channels. | (1) Lose information rates. (2) Many APP detector updates (steep EXIT). |
| (C) BICM with Inner Space-Time Codes | (1) Use one code designed for AWGN channels. (2) Few detector updates (flat EXIT). | (1) Lose information rates (unless orthogonal). (2) Complex APP detection (unless orthogonal). |
| (D) V-BLAST | (1) Use codes designed for AWGN channels. (2) Achieve ergodic information rates. (3) Few soft detector updates (flat EXIT). | (1) Lose quasistatic information rates (many codes). (2) Interference cancellation. (3) Increased delay (reduced reliability). |
| (E) D-BLAST | (1) Use one code designed for AWGN channels. (2) Achieve ergodic and quasistatic information rates (3) Few soft detector updates (flat EXIT). | (1) Interference cancellation. (2) Increased delay (reduced reliability). (3) Error propagation. |

For Direct Mapping, one code with rate $R_c$ and length $n_c$ is used and the coded bits are mapped directly onto the modulation signal set. For instance, for quaternary phase-shift keying (QPSK) the coded bits are parsed into blocks of length 2M and these blocks are mapped onto an M-antenna QPSK symbol using Gray mappings.

For BICM, one code with rate $R_c$ and length $n_c$ is used and the coded bits are interleaved and then mapped onto the modulation signal set as above. For BICM with Inner Space-Time Codes, one code with rate $R_c$ and length $n_c$ is used and the coded bits are interleaved and then mapped onto a space-time code.

For V-BLAST, M codes with rates $R_c(m)$, m=1, 2, . . . , M and lengths $n_c/M$ are used. The symbols corresponding to each codeword of length $n_c/M$ are called a layer. The coded bits of codeword m are mapped onto antenna m, m=1, 2, . . . , M. V-BLAST encoding is basically the same as multi-level coding or generalized concatenated coding.

For D-BLAST, one code with rate $R_c$ and length $n_c$ is used and $n_c/M$ of the coded bits are mapped onto the first antenna symbol in a first block, another $n_c/M$ of these bits are mapped onto a second antenna symbol in a second block, and so forth until the Mth block. The symbols corresponding to the entire codeword of length $n_c$ are called a layer. Similar steps with other codewords are performed, but the mappings are successively shifted by one block for every codeword.

Figure 6A:
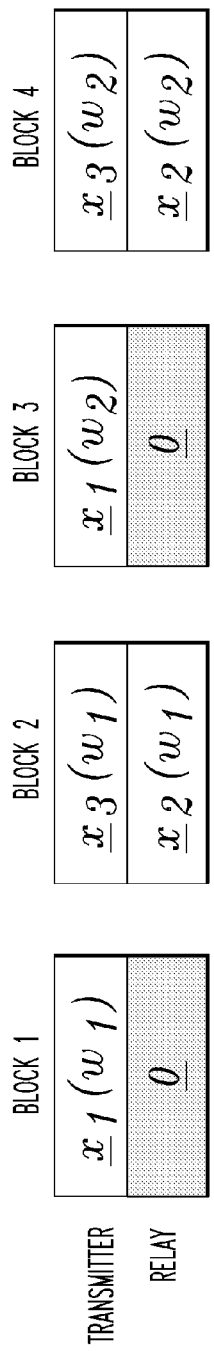
FIGS. 6A, 6B and 6C illustrate embodiments of transmission protocols employing PDF strategies constructed in accordance with the principles of the present invention.
Figure 6B:
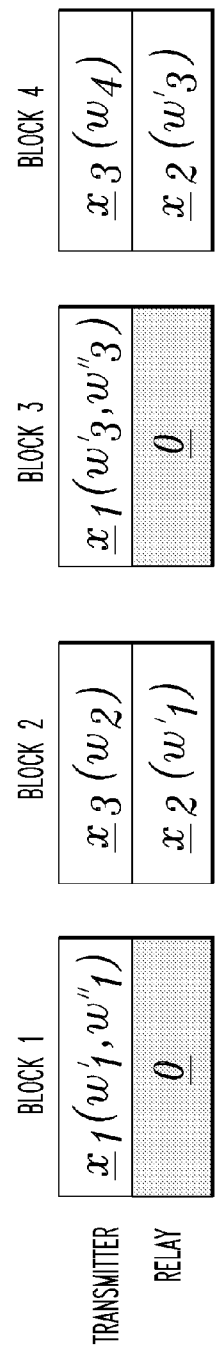
Figure 6C:
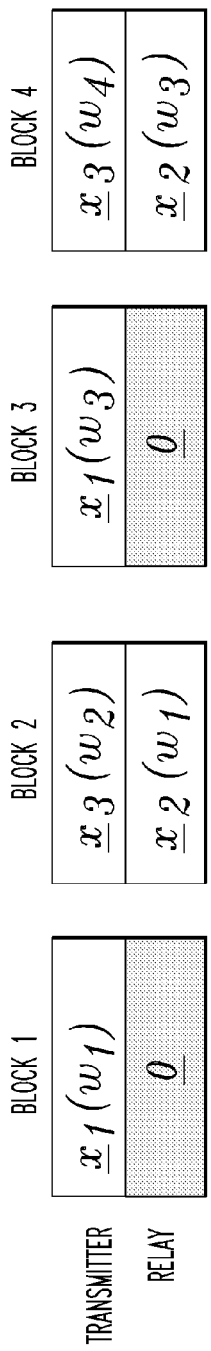

Turning now to FIGS. 6A, 6B and 6C, illustrated are embodiments of transmission protocols employing PDF strategies constructed in accordance with the principles of the present invention. Each of the PDF strategies includes a set of time blocks Block 1, Block 2, Block 3 and Block 4 wherein each time block contains a transmitter segment and a relay segment, as shown. The embodiments of FIGS. 6A, 6B and 6C represent PDF strategies for a half-duplex relay, which may only either decode (listen) or transmit (talk) during each time block.

FIG. 6A shows an embodiment of a transmission protocol that may be employed with Direct Mapping or BICM. One codeword is generated for every pair of time blocks using one encoder with rate $R_c$, and the codewords may be expressed as $$\underline{x}(w_i) = [\underline{x}_1(w_i) \underline{x}_2(w_i) \underline{x}_3(w_i)] \qquad (37)$$

Therefore, one codebook is generated and each of its codewords $\{\underline{x}\}(w_i)$ of length n is split into three codewords $\{\underline{x}\}_1(w_i)$, $\{\underline{x}\}_2(w_i)$ and $\{\underline{x}\}_3(w_i)$ with respective lengths $m_1$, $m_2$ and $m_3$ where $m_1+m_2+m_3=n$. The coded bits are mapped onto the modulation signal sets at the transmitter and relay, either with or without bit interleaving. The relay decodes the message bits after having received the first block (Block 1) of outputs from the transmitter.

The first codeword may have a first length and the second and third codewords may have a same second length since they are transmitted concurrently from the relay and transmitter, respectively. The first codeword $\underline{x}_1(w_i)$ will be transmitted only by the transmitter. The second codeword $\underline{x}_2(w_i)$ will be transmitted only by the relay, and the third codeword $\underline{x}_3(w_i)$ only by the transmitter. The relay decodes the first codeword $\underline{x}_1(w_i)$ once it is complete. The relay is able to decode the entire message corresponding to this codeword even though it has received only the first codeword $\underline{x}_1(w_i)$ of the three-part codebook. The first codeword length could be half since Block 1 and Block 2 may have different lengths.

This approach gives good reliability on the combined transmitter and relay-to-receiver link. However, early decoding at the relay may severely restrict the code rate $R_c$. For example, if $n_1=n_2$ (where the relay channel may be referred to as $n_1 \times n_2 \times n_3$ based on the number of transmitter×relay×receiver antennas) and both the transmitter and relay use QPSK, then it is required that $R_c < \frac{1}{3}$ because the relay has seen only ⅓ of the potential received symbols at the time of decoding. An adjustment of the modulation signal sets and the amount time that the relay listens and talks may alleviate this situation. Additionally, a strategy with one code is a pure DF scheme where the relay decodes all of the message bits. Such an approach may be suboptimal for half-duplex channels.

FIG. 6B shows an embodiment of a transmission protocol that may be employed with V-Blast wherein an adaptation of V-BLAST encoding to half-duplex relaying is employed using three different codebooks. Each of the three codebooks is used corresponding to each of the three segments in Block 1 and Block 2 of FIG. 6B, as shown. The codewords may be represented by:

$$\underline{x}(w_1) = \underline{x}_1(w_1', w_1'') \text{ and } \underline{x}_2(w_1') \text{ and } \underline{x}_3(w_2), \quad (38)$$

where $w_i = [w_i', w_i'']$.

The three separate codebooks can have different rates. The relay decodes after Block 1, wherein it uses the message bits that it has decoded to encode its own codeword. If the rate of the relay codebook with codeword $\underline{x}_2(w_1')$ is the same as the transmitter codebook with first codeword $\underline{x}_1(w_1', w_1'')$, then $w_1'' = 0$ and the bits $w_1 = w_1'$ are mapped directly into the relay codeword $\underline{x}_2(w_1')$. But, the relay codebook may be chosen to have a smaller rate. If a smaller rate is used, then only a portion of the bits may have been decoded and may be used to encode the codeword. In this case, the second codebook would have an equal or smaller rate than the first codebook. The third codebook can have any rate and will transmit new information.

For example, consider an $n_1 \times n_2 \times n_3$ of $1 \times 1 \times 1$ rate point $(d,R) = (0.25, 1.5)$. This point may be achieved by using the PDF strategy in FIG. 6B with three rate ½ codes. However, the message $w_b$, b odd, has to be decoded at the receiver by using the combined decoding graph of both codes that carry this message. In fact, by using a common rate for these two codebooks and decoding them jointly, an encoding/sliding window decoding strategy is being employed. One can, of course, also choose different rates for these codebooks without any conceptual changes to the protocol or theory.

FIG. 6C shows an embodiment of a transmission protocol that may be employed with D-Blast wherein a D-BLAST encoding to half-duplex relaying employs two different codebooks. A separate codebook is used for each of the two messages in the time blocks Block 1, Block 2 as shown in FIG. 6C. The codewords may be represented by:

$$\underline{x}(w_i) = [\underline{x}_1(w_i), \underline{x}_2(w_i)] \text{ and } \underline{x}_3(w_i). \quad (39)$$

This transmission protocol depicts an intermediate approach where the transmitter segment of Block 1 and the relay segment of Block 2 come from one codebook that is longer than one transmission block, e.g., it may be twice as long. The transmitter segment of Block 2 comes from another codebook.

The relay has to decode $w_1$ after having received only the transmitter segment of Block 1 from the transmitter. A value of $R < ½$ is required for the $w_1$ encoder (assuming that $n_1 = n_2$ and the transmitter and relay use the same signal set). It may be noted that the D-BLAST approach to half-duplex relaying does not suffer from error propagation, which is different from the full-duplex case.

Examples of MIMO applications employing the PDF transmission protocols depicted in FIGS. 6A-6C are presented below, wherein reference to the relay channel as $n_1 \times n_2 \times n_3$ based on the number of device antennas is again employed. Two cases with QPSK modulation are considered.

Figure 7:
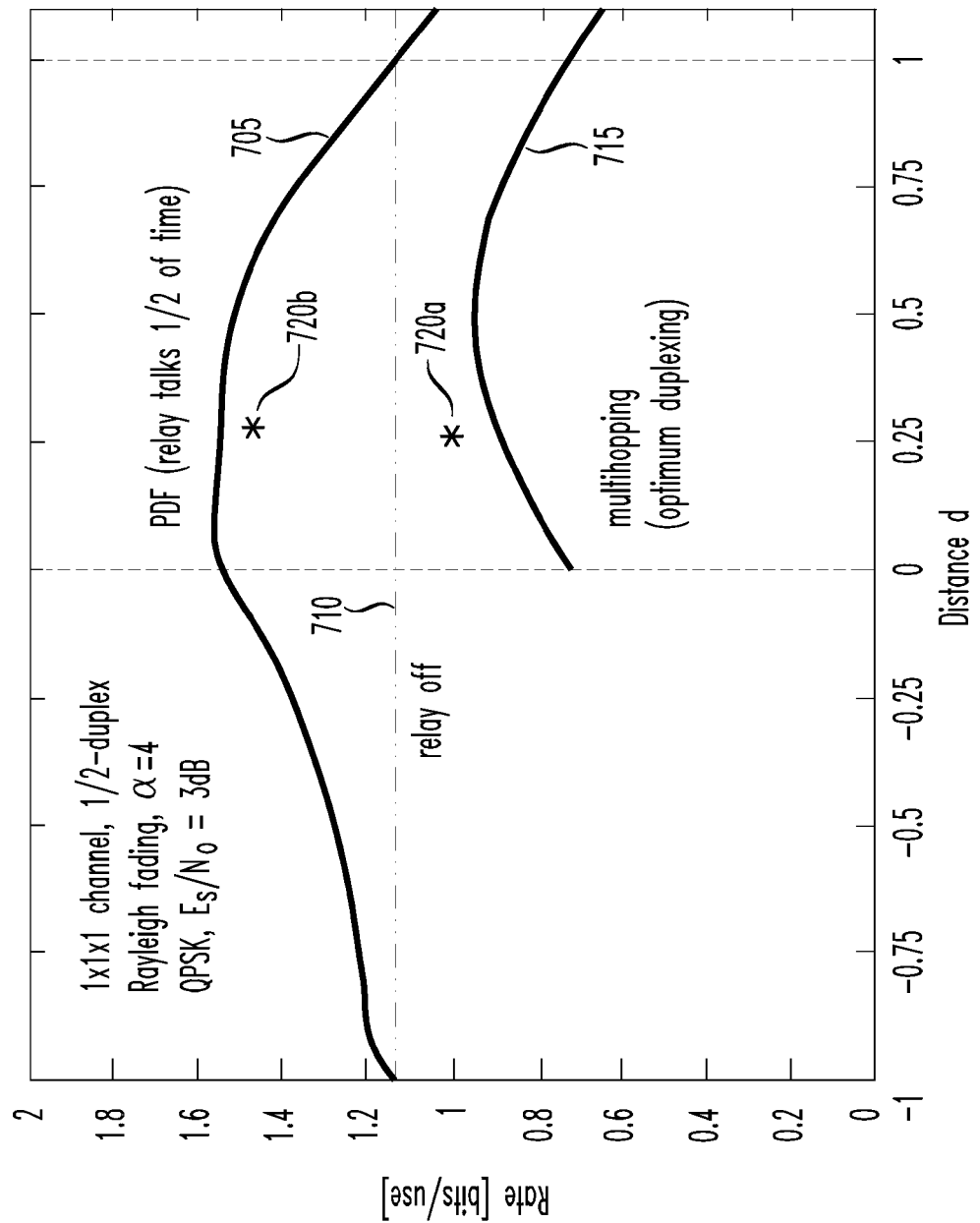
FIG. 7 illustrates simulation results corresponding to a 1×1×1 system with $P_1=P_2=2$ (or $E_s/N_0=3$ dB)

Turning now to FIG. 7, illustrated are simulation results corresponding to a $1 \times 1 \times 1$ system with $P_1 = P_2 = 2$ (or $E_s/N_o = 3$ dB). A PDF rate curve 705 is shown in FIG. 7 as a function of d. Also shown are a no-relay rate boundary 710 (R≈1.13 bits per use) and a traditional multihopping rate curve 715 with optimized listen and transmit times. Observe that PDF achieves substantial rate gains over both no-relay transmission and traditional multihopping. For instance, the points 720a and 720b in FIG. 7 correspond to $(d,R) = (0.25, 1.0)$ and $(d,R) = (0.25, 1.5)$. Note that the multihopping curve 715 is well below the "relay off" boundary 710, and that the PDF curve 705 is flat near d=0.25. This happens because the transmitter-to-relay link capacity is almost saturated at the maximum QPSK rate of 2 bits per use. One should therefore use a larger modulation signal set (e.g., 8-PSK) for the odd-numbered blocks in FIG. 6C.

Figure 8:
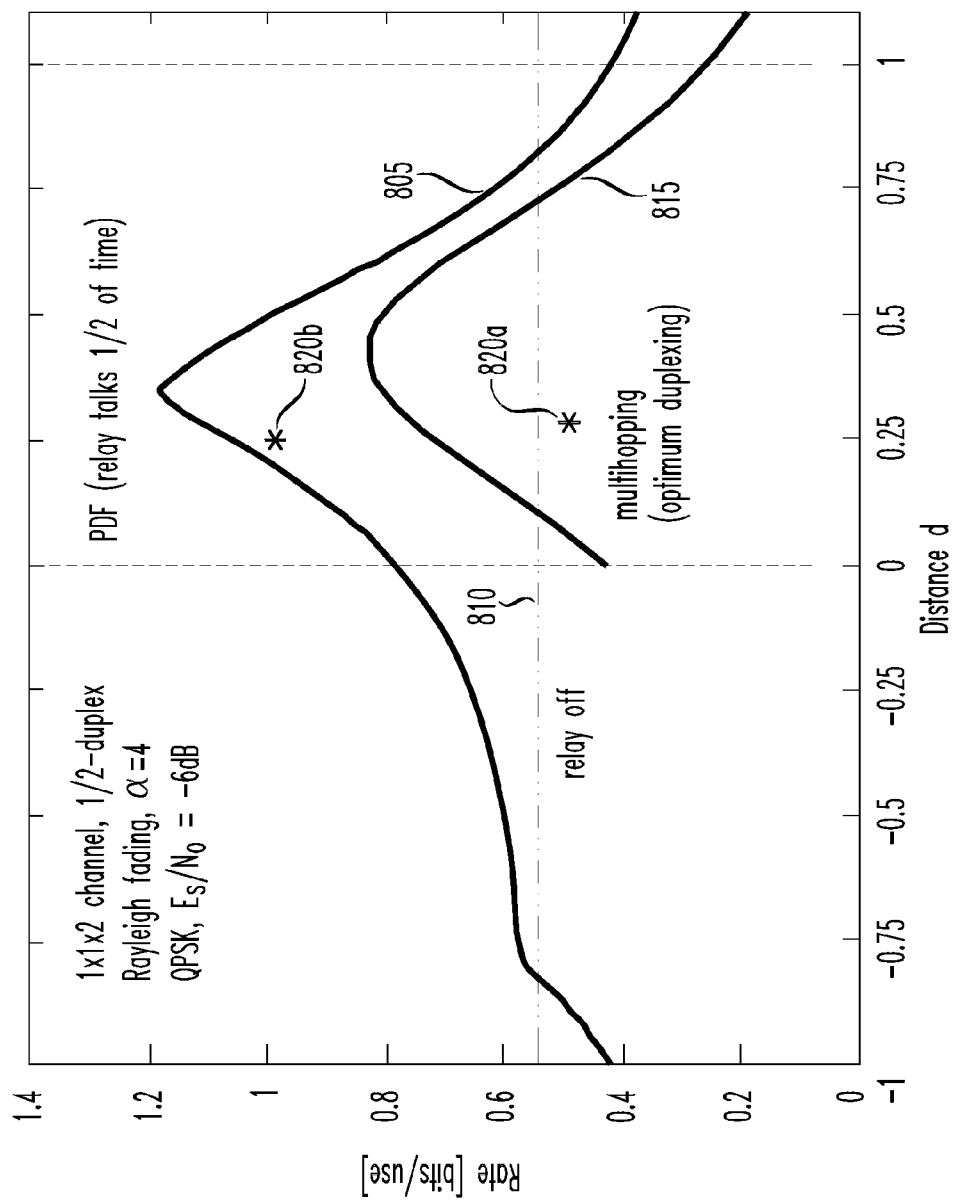
FIG. 8 illustrates simulation results corresponding to a 1×1×2 system with $P_1=P_2=0.25$ (or $E_s/N_0=-6$ dB)

Turning now to FIG. 8, illustrated are simulation results corresponding to a $1 \times 1 \times 2$ system with $P_1 = P_2 = 0.25$ (or $E_s/N_0 = -6$ dB). A PDF rate curve 805 is shown in FIG. 8 as a function of d. FIG. 8 also shows a no-relay rate boundary 810 (R≈0.54 bits per use) and a traditional multihopping rate curve 815 with optimized listen and transmit times. The points 820a and 820b correspond to $(d,R) = (0.25, 0.5)$ and $(d,R) = (0.25, 1)$. It may be noted that the multihopping curve 815 is well below the PDF rate curve 805.

Code design is usually done by using density evolution or EXIT charts. The latter approach may be employed to design irregular low-density parity-check (LDPC) codes using a curve-fitting procedure. The coded bits are mapped to QPSK symbols via the Gray mapping. A decoder uses the standard graph representation of an LDPC code with variable nodes on the left and check nodes on the right. The left and right nodes are connected by edges whose nodes are chosen with a random permutation that avoids 2-cycles. The decoder iterates 60 times between the left and right nodes by using an a posteriori probability (APP) decoder.

Figure 9:
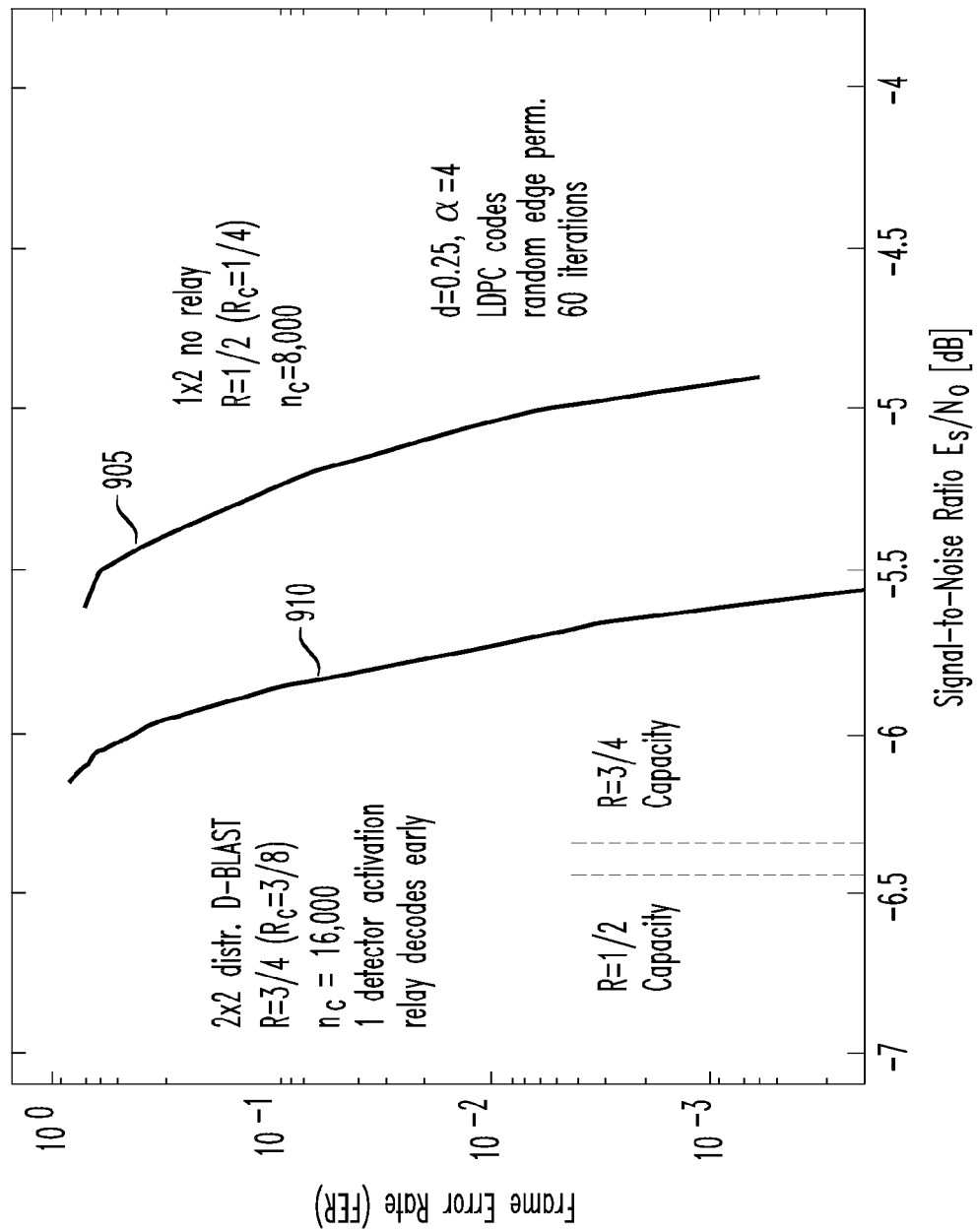
FIG. 9 illustrates a PDF frame error rate (FER) simulation for the 1×1×2 system of FIG. 8 employing a d=0.25.

Turning now to FIG. 9, illustrated is PDF frame error rate (FER) simulation for the $1 \times 1 \times 2$ system of FIG. 8 and d=0.25. Consider R=½ without a relay. An LDPC code is designed with rate $R_c = ¼$ and length $n_c = 8,000$ that has an (single-antenna, no fading, BPSK) AWGN decoding threshold of $E_b/N_0 = -0.4$ dB, which is about 0.3 dB from capacity. The resulting frame error rates are shown by a FER curve 905 in FIG. 9. Observe that the code operates within 1.5 dB of capacity at an FER of $10^3$. The extra loss (as compared to 0.3 dB for the single-antenna case) can be attributed to the short code length and the fading.

Consider next R=1 wherein an LDPC code is designed with rate $R_c = ⅜$ and length $n_c = 16,000$ that has an (single-antenna, no fading, BPSK) AWGN decoding threshold of $E_b/N_0 = 0.1$ dB, which is about 0.45 dB from capacity. The encoding and decoding procedure is as follows.

In the odd-numbered time blocks b=1, 3, 5, . . . , the transmitter transmits 4000 QPSK symbols (or 8,000 of the 16,000 codeword bits) by using the rate $R_c = ⅜$ LDPC code. After every odd-numbered block b, the relay decodes the information bits of the $R_c = ⅜$ code from this block. Note that the relay has received only half of this codeword's symbols. In the even-numbered time blocks b=2, 4, 6, . . . , the transmitter transmits using the rate $R_c = ¼$ code described above. In the even-numbered blocks, the relay encodes the information bits decoded from the previous block by using the $R_c = ⅜$ encoder and transmits the last 4000 QPSK symbols of this codeword (or the last 8,000 of the 16,000 codeword bits).

After every even-numbered time block, the receiver decodes the information bits of the rate $R_c = ⅜$ code. The receiver performs only one detector activation per codeword (multiple detector activations may improve the performance marginally). The receiver cancels the interference caused by the symbols of the $R_c=\frac{3}{8}$ code from the even-numbered time blocks. After every even-numbered time block, the receiver decodes the information bits of the $R_c=\frac{1}{4}$ code.

The overall rate is $R=2(\frac{3}{8})+2(\frac{1}{4})(\frac{1}{2})=1$ bit per use, where the leading factors 2 are due to the QPSK modulation. There are three decoding steps to consider. The FER of the relay decoding step is not shown in FIG. 9 because it lies far to the left of the other two curves. The FER of the receiver decoding the information bits from the $R_c=\frac{3}{8}$ code is shown as a curve 910 in the FIG. 9 (labeled "2×2 distr. D-BLAST").

The FER of the receiver decoding the information bits from the $R_c=\frac{1}{4}$ code is the same as the case where there is no relay, and is the curve 905 in FIG. 9. It may be seen that the dominating FER is in both cases (without and with a relay) due to the direct link from the transmitter to the receiver. The reliability of the two schemes is therefore the same. However, the PDF scheme doubles the rate.

Figure 10:
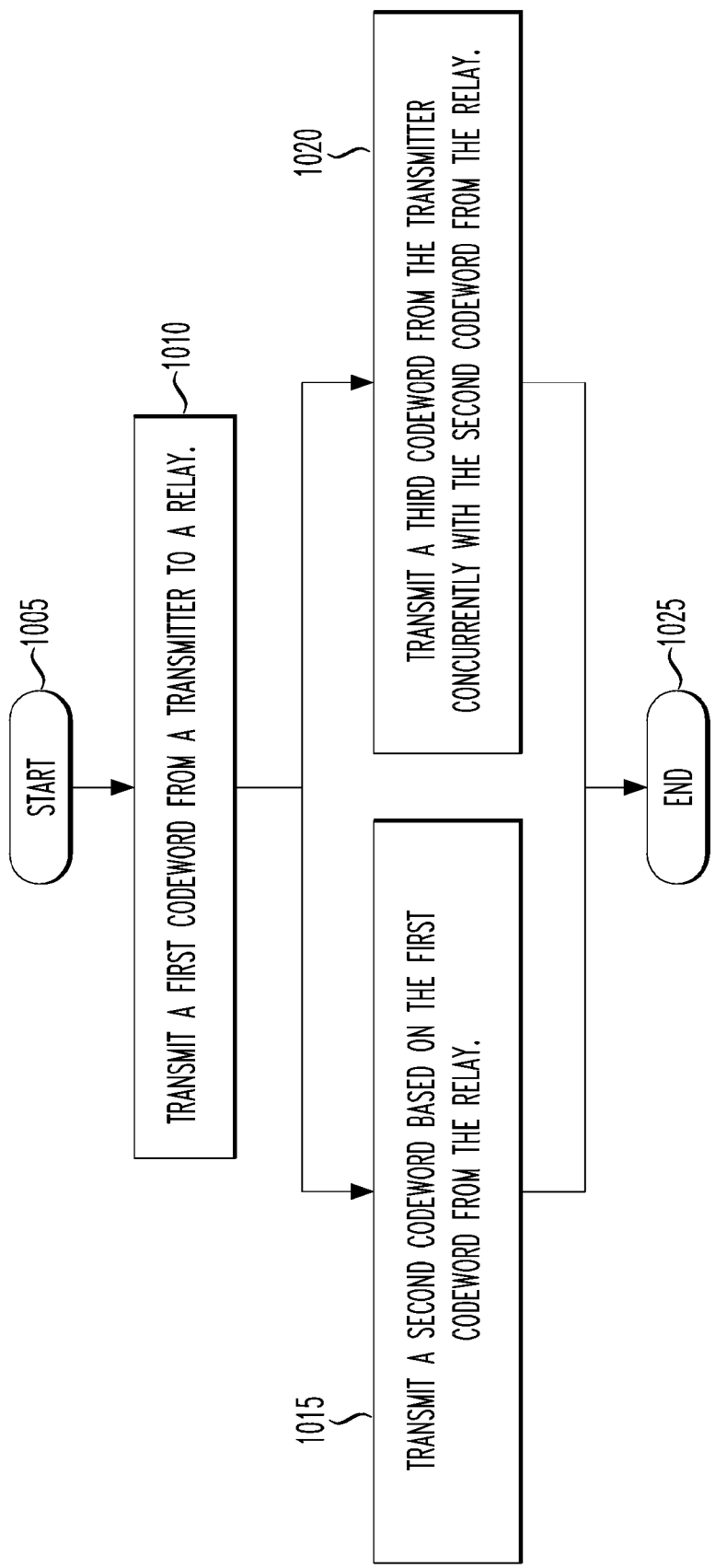
FIG. 10 illustrates a flow diagram of an embodiment of a method of transmitting a message carried out in accordance with the principles of the present invention.

Turing now to FIG. 10, illustrated is a flow diagram of an embodiment of a method of transmitting a message carried out in accordance with the principles of the present invention. The method of FIG. 10 is for use with a distributed transmission of codewords as depicted by the embodiments of the transmission protocols shown in FIGS. 4, 5 and 6, for example, and starts in a step 1005. Then, in a step 1010, a first codeword is transmitted from a transmitter to a relay.

In a subsequent transmission, a second codeword, which is based on the first codeword, is transmitted from the relay in a step 1015. Along with this subsequent relay transmission in the step 1015, the transmitter transmits a third codeword concurrently with the second codeword from the relay, in a step 1020.

The codewords may be derived from a single codebook, come from separate codebooks or share a portion of one of several codebooks that are employed. In one embodiment, the first, second and third codewords correspond to a single message and are derived from a single codebook.

In an alternative embodiment, the first and second codewords correspond to a first portion of a message and the third codeword corresponds to a second portion of the message. The first codeword is derived from a first codebook, the second codeword is derived from a second codebook and the third codeword is derived from a third codebook. Additionally, the method further includes generating first and second data based on a portion of a message, the first codeword corresponds to both first and second data and the second codeword corresponds to only one of the first and second data.

In yet another embodiment, the first codeword and the second codeword are derived from a first codebook and the third codeword is derived from a second codebook. Here, the first codeword and the second codeword may correspond to a first portion of a message and the third codeword may correspond to a second portion of the message. The method ends in a step 1025.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention relating to transmission systems and methods that involve a relay have been presented. The systems include a distributed transmitter that includes a transmitter and a relay. In the new method, the transmitter transmits a codeword for a data block to the relay and to a receiver in a first time block. The relay receives and decodes this transmitted codeword. In a later time block, the relay transmits a second codeword and the transmitter transmits a third codeword concurrently with the second codeword for the data block. Thus, the receiver receives first and third codewords from the transmitter and the second codeword from the relay. In particular, the receiver receives a portion of the codewords in different time blocks, that is, in a time diverse manner. Typically, the transmitter and relay are not co-located.

Although the present invention has been described in detail, those skilled in the art should understand that they can make various changes, substitutions and alterations herein without departing from the spirit and scope of the invention in its broadest form.

What is claimed is:

1. A method for use in relay apparatus, comprising:
   receiving a first codeword encoded using a first codebook from a transmitter; and
   re-encoding the first codeword using a second codebook to become a second codeword; wherein the second codeword is transmitted from the relay apparatus concurrently with transmission by the transmitter of a third codeword, which is encoded using a third codebook; and wherein at least two of the codebooks have different code rates and the first and second codebooks are different.

2. The method as recited in claim 1 wherein the first codeword, the second codeword and the third codeword correspond to a message.

3. The method as recited in claim 1 wherein the first codeword and the second codeword correspond to a first portion of a message and the third codeword corresponds to a second portion of the message.

4. The method as recited in claim 1 further comprising generating first and second data based on a portion of a message, the first codeword corresponding to both first and second data and the second codeword corresponding to only one of the first and second data.

5. The method as recited in claim 1 further comprising using turbo coding or low-density parity-check (LDPC) coding in each of the first, second, and third codebooks.

6. The method as recited in claim 1, wherein a transmission protocol for the subsequent transmitting of a second codeword using a second codebook from the relay includes at least a partial decode-and-forward (PDF) strategy.

7. An apparatus, comprising:
   a transmitter configured to transmit a first codeword encoded using a first codebook to a relay capable of re-encoding the first codeword using a second codebook to become a second codeword; wherein the transmitter is also configured to transmit a third codeword encoded using a third codebook concurrently with transmission of the second codeword from the relay, wherein the at least two of the codebooks have a different code rate and the first and second codebooks are different.

8. The apparatus as recited in claim 7 wherein the first codeword, the second codeword and the third codeword correspond to a message.

9. The apparatus as recited in claim 7 wherein the first codeword and the second codeword correspond to a first portion of a message and the third codeword corresponds to a second portion of the message.

10. The apparatus as recited in claim 7 wherein the transmitter is further configured to generate first and second data based on a portion of a message, the first codeword corresponding to both first and second data and the second codeword corresponding to only one of the first and second data.

11. The apparatus as recited in claim 7 wherein the first, second, and third codebooks use turbo coding or low-density parity-check (LPDC) coding.

12. The apparatus as recited in claim 7, wherein a transmission protocol for the relay includes at least a partial decode-and-forward (PDF) strategy.

13. An apparatus, comprising:
a relay configured to re-encode a first codeword received from a transmitter using a first codebook to become a second codeword; wherein the relay is also configured to transmit the second codeword concurrently with transmission by the transmitter of a third codeword, which is encoded using a second codebook and wherein the first and second codebooks are different.

14. The apparatus as recited in claim 13 wherein the first and second codebooks use turbo coding or low-density parity-check (LPDC) coding.

15. The apparatus as recited in claim 13, wherein a transmission protocol for the relay includes at least a partial decode-and-forward (PDF) strategy.

16. A method, comprising:
transmitting a first codeword encoded using a first codebook to a relay for re-encoding the first codeword using a second codebook to become a second codeword; and
transmitting a third codeword encoded using a third codebook concurrently with transmission of the second codeword from the relay; wherein the first and second codebooks are different.

17. The method as recited in claim 16 further comprising using turbo coding or low-density parity-check (LDPC) coding in each of the first and second codebooks.

18. The method as recited in claim 16, wherein a transmission protocol for the subsequent transmitting of a second codeword using a second codebook from the relay includes at least a partial decode-and-forward (PDF) strategy.

* * * * *